United States Patent
Lewis et al.

(10) Patent No.: US 7,413,409 B2
(45) Date of Patent: Aug. 19, 2008

(54) TURBINE AIRFOIL WITH WEIGHT REDUCTION PLENUM

(75) Inventors: Matthew Taylor Lewis, Maiden, MA (US); Nigel Brian Thomas Langley, Danvers, MA (US); Raafat Kammel, Peabody, MA (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 11/307,608

(22) Filed: Feb. 14, 2006

(65) Prior Publication Data

US 2007/0189904 A1     Aug. 16, 2007

(51) Int. Cl.
*F01D 5/18* (2006.01)

(52) U.S. Cl. ................ 416/232; 416/233

(58) Field of Classification Search ........... 416/232, 416/233, 236 R
See application file for complete search history.

(56) References Cited

U.S. PATENT DOCUMENTS

| | | | |
|---|---|---|---|
| 4,364,160 A | 12/1982 | Eiswerth | |
| 5,243,758 A | 9/1993 | LeMonds et al. | |
| 5,253,824 A | 10/1993 | Halila et al. | |
| 5,269,058 A | 12/1993 | Wiggs et al. | |
| 5,441,574 A | 8/1995 | Hansen et al. | |
| 5,469,618 A | 11/1995 | LeMonds et al. | |
| 6,162,347 A | 12/2000 | Fleck | |
| 2005/0084380 A1* | 4/2005 | Fett et al. | 416/233 |

* cited by examiner

*Primary Examiner*—Edward K. Look
*Assistant Examiner*—Dwayne J White
(74) *Attorney, Agent, or Firm*—Adams Intellectual Property Law, P.A.; William Scott Andes, Esq.

(57) ABSTRACT

An airfoil for a gas turbine engine includes: opposed pressure and suction sidewalls extending between spaced-apart leading and trailing edges, a root, and a tip; and a hollow plenum disposed between the sidewalls. The plenum has a chordwise first dimension at a radially outer end thereof, and a chordwise second dimension at a radially inner end thereof. The second dimension is substantially less than the first dimension.

12 Claims, 4 Drawing Sheets

TURBINE AIRFOIL WITH WEIGHT REDUCTION PLENUM

BACKGROUND OF THE INVENTION

This invention relates generally to gas turbine components, and more particularly to turbine airfoils.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed by a turbine rotor.

Each turbine rotor carries a circumferential array of airfoil-shaped turbine blades adapted to extract energy from the combustion gases exiting the core. These blades are typically constructed by casting from high-temperature resistant alloys (e.g. "superalloys"). The first rotor stage, immediately downstream of the combustor, is usually internally cooled and has a hollow interior with one or more serpentine passages, film cooling holes, trailing edge slots or holes, and the like. The subsequent rotor stages are not subject to the extreme high temperature of the first stage and thus does not require cooling. To reduce the weight of the later-stage airfoils, they often include a hollowed-out internal portion referred to as a "weight reduction plenum". Unfortunately, the shape of the prior art weight reduction plenum can cause the airfoil to fail and separate at the interface between the hollow plenum and the solid airfoil portion.

Accordingly, there is a need for a turbine blade having low weight while maintaining high strength.

BRIEF SUMMARY OF THE INVENTION

The above-mentioned need is met by the present invention, which according to one aspect provides opposed pressure and suction sidewalls extending between spaced-apart leading and trailing edges, a root, and a tip; and a hollow plenum disposed between the sidewalls, the plenum having a chordwise first dimension at a radially outer end thereof, and a chordwise second dimension at a radially inner end thereof, the second dimension being substantially less than the first dimension.

According to another aspect of the invention, a turbine nozzle segment includes opposed pressure and suction sidewalls extending between spaced-apart leading and trailing edges, a root, and a tip; and a hollow plenum disposed between the sidewalls, the plenum having a tapered shape with a greater chordwise dimension at its radially outer end than at its radially inner end, wherein a centered of the plenum is disposed substantially forward of a mid-chord position of the airfoil.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
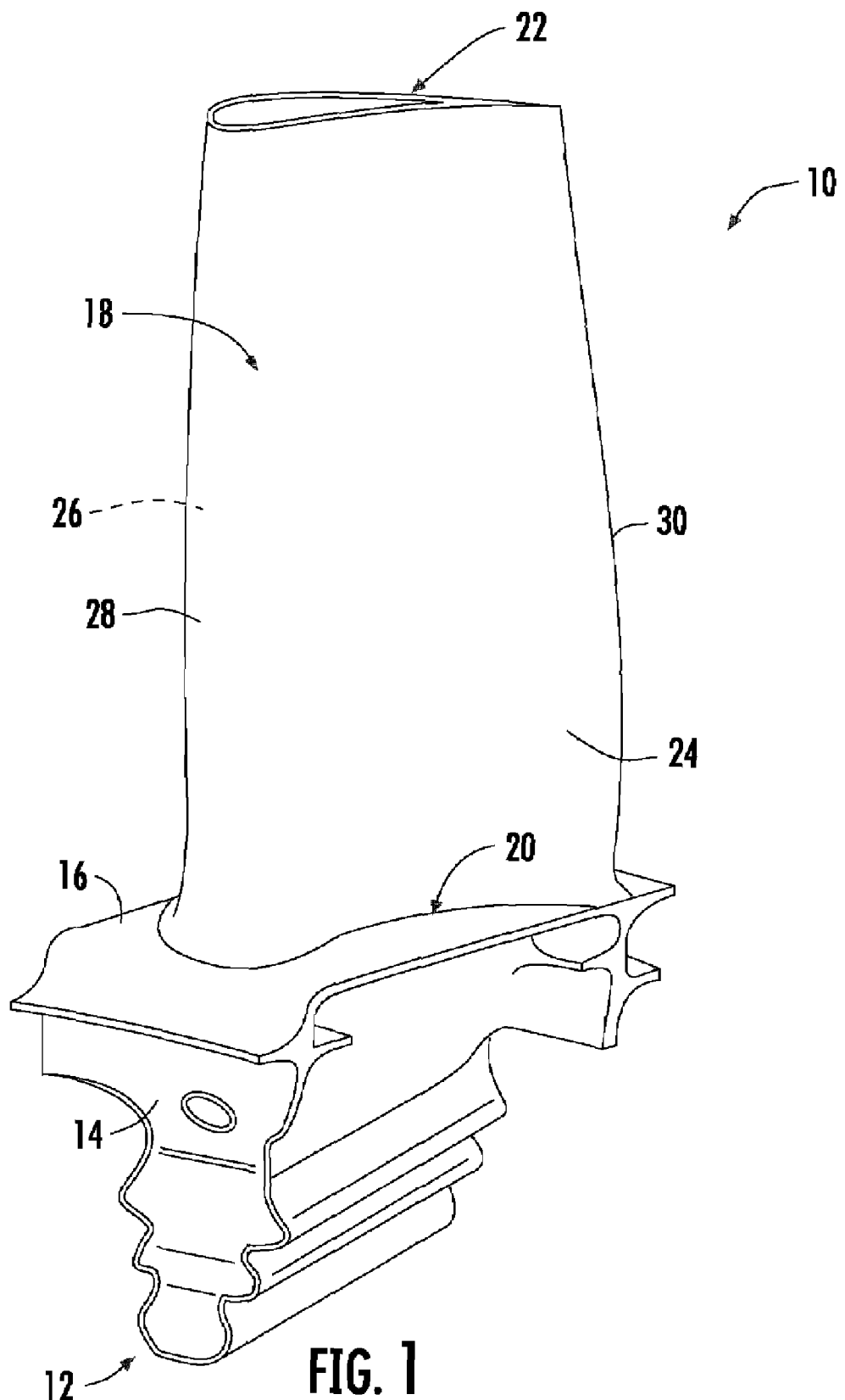
FIG. 1 is a perspective view of a prior art turbine airfoil.

Referring to the drawings wherein identical reference numerals denote the same elements throughout the various views, FIG. 1 illustrates an exemplary prior art high pressure turbine (HPT) blade 10. The turbine blade 10 includes a dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil 18 has a root 20 at the junction of the platform 16 and the airfoil 18, and a tip 22 at its radially outer end. The airfoil 18 has a concave pressure sidewall 24 and a convex suction sidewall 26 joined together at a leading edge 28 and at a trailing edge 30. The airfoil 18 may take any configuration suitable for extracting energy from the hot gas stream and causing rotation of the rotor disk.

The turbine blade 10 is typically formed as a one-piece casting of a suitable superalloy, such as a nickel-, cobalt-, or iron-based superalloy, which has acceptable strength at the elevated temperatures of operation in a gas turbine engine. The airfoil 18 includes a hollow space or plenum referred to as a weight reduction plenum 32, shown in FIG. 2, the purpose of which is to eliminate material in non-essential areas. This reduces the weight of the turbine blade 10 which has important benefits, including reductions both in operating stresses and material costs. A plurality of reinforcing pins 34 are part of the casting and extend laterally from the pressure sidewall 24 to the suction sidewall 26.

The shape of the weight reduction plenum 32 follows the external airfoil geometry on a section-by-section basis. The depth "D1" of the plenum, i.e. its length in a radial direction, is set based on hardware weight requirements and load to area ratio requirements. The cross-sectional area of the weight reduction plenum 32 is set to control the thickness of the pressure and suction sidewalls 24 and 26.

When viewed in side elevation, the outer boundary of the weight reduction plenum 32 is bounded by a top edge 36, spaced-apart forward and aft edges 38 and 40, and a bottom edge 42. The bottom edge 42 has a central portion 44 that is substantially longitudinally oriented (i.e. horizontal in side elevation view). The central portion 44 is joined to the forward and aft edges 38 and 40 by radiused forward and aft portions 46 and 48, respectively. The geometric distribution of the weight reduction plenum 32 is essentially symmetrical in relation to a radially-extending line "L1" disposed at approximately the mid-chord location of the airfoil 18. The chordwise dimension of the weight reduction plenum 32 is relatively large compared to the airfoil chord near the bottom edge 42, and there is a relatively abrupt transition from the hollow weight reduction plenum 32 to the solid portion of the airfoil 18 along line "T". This exacerbates stresses and makes the prior art airfoil 18 prone to failure and separation along the line T.

Figure 3:
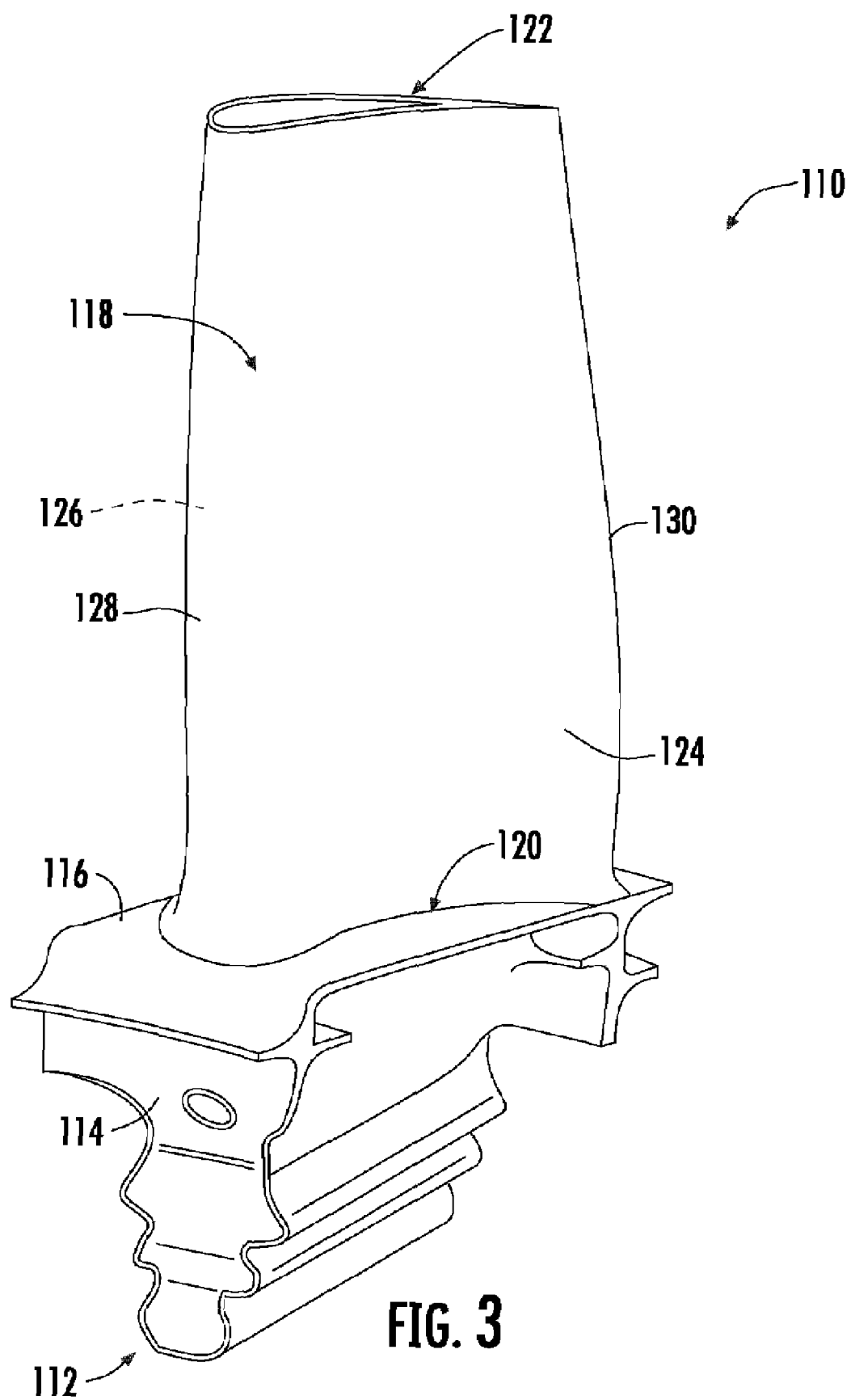
FIG. 3 is a perspective view of turbine blade constructed according to the present invention.

FIG. 3 illustrates an exemplary high pressure turbine (HPT) blade 110 constructed in accordance with the present invention. The turbine blade 110 is similar in general construction to the turbine blade 10 described above and includes a dovetail 112, a blade shank 114, a platform 116, and an airfoil 118 having a root 120 and a tip 122. The airfoil 118 has a pressure sidewall 124 and a suction sidewall 126 joined together at a leading edge 128 and at a trailing edge 130. As noted above, the turbine blade 110 may be formed as a one-piece casting of a suitable superalloy, such as a nickel-, cobalt-, or iron-based superalloy, which has acceptable strength at the elevated temperatures of operation in a gas turbine engine.

The airfoil 118 includes a hollow space or plenum referred to as a weight reduction plenum 132, the purpose of which is to eliminate metal in non-essential areas. This reduces the weight of the turbine blade 110 which has important benefits including reductions both in operating stresses and material costs. A plurality of reinforcing pins 134 are part of the casting and extend laterally from the pressure sidewall 124 to the suction sidewall 126. The shape of the weight reduction plenum 132 follows the external airfoil geometry on a section-by-section basis. The cross-sectional area of the weight reduction plenum 132 is set to achieve desired thicknesses of the pressure and suction sidewalls 124 and 126.

Figure 4:
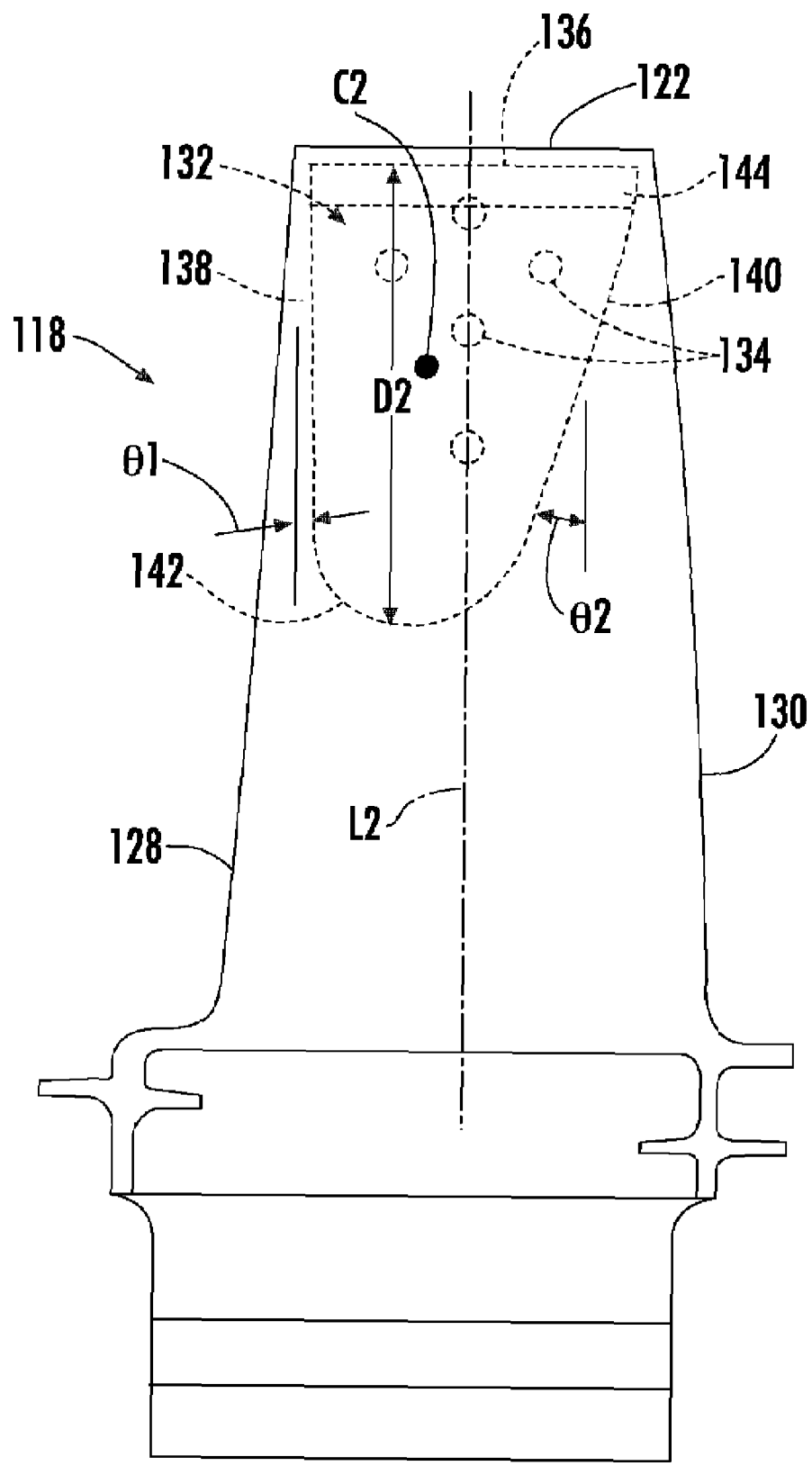
FIG. 4 is a side view of the airfoil of FIG. 3.

When viewed in side elevation, as shown in FIG. 4, the outer boundary of the weight reduction plenum 132 is defined by a top edge 136, spaced-apart forward and aft edges 138 and 140, and a bottom edge 142. The bottom edge 142 joins the forward and aft edges 138 and 140, and may be a continuous convex-downward curve as illustrated. In the illustrated example, the forward edge 138 is disposed at a slight angle "θ1" to a radial direction, such that the radially inner end of the forward edge 138 is aft of the radially outer end thereof. The aft edge 140 is disposed at an angle "θ2" to a radial direction, such that the radially inner end of the aft edge 140 is forward of the radially outer end thereof. The angle θ2 is substantially greater than the angle θ1. The forward and aft edges need not be linear as depicted, and they may be curved to match the stress profile of a particular airfoil.

Figure 2:
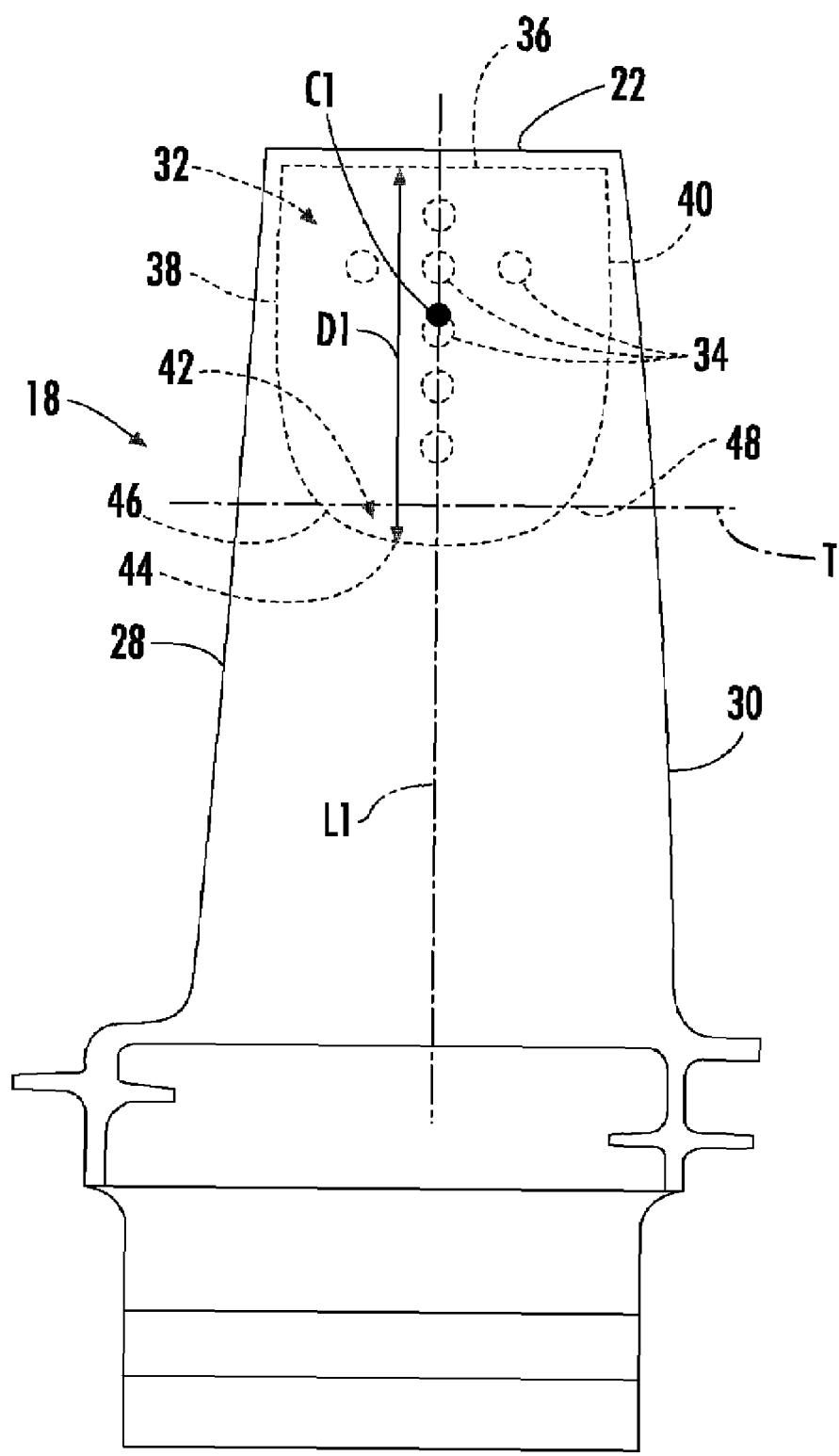
FIG. 2 is a side view of the airfoil of FIG. 1.

The net effect of this shaping is that a centroid "C2" of the weight reduction plenum 132 is disposed substantially forward of a mid-chord location of the airfoil 118, indicated at "L2", and also substantially forward of the centroid "C1" of the prior art weight reduction plenum 32 (see FIG. 2). Except for a relatively small tip portion 144, the chordwise dimension of the weight reduction plenum 132 is substantially less than that of its prior art counterpart, especially near the root 120 of the airfoil 118. At the same time, the maximum depth "D2" of the weight reduction plenum 132, i.e. its length in a radial direction, is substantially greater than that of the prior art weight reduction plenum 32.

This gradual reduction in chord, along with the curved bottom edge 142, increases the cross-sectional area of the solid portion of the airfoil 118 near the bottom edge 142, and helps to avoid an abrupt transition from a hollow portion of the airfoil 118 to the solid portion. This will reduce the maximum airfoil stress, which will increase the life of the airfoil 118 compared to the prior art airfoil 18. At the same time, the total volume of the weight reduction plenum 132 is at least the same and generally greater than that of the prior art weight reduction airfoil 32, so the weight reduction benefit to the airfoil 118 is not lessened. In the illustrated example, the vertical cross-section of the plenum 132 containing the maximum depth D2 is substantially aligned with the thickest portion of the airfoil cross-section. The exact shape and dimensions of the weight reduction plenum 132 are determined on a case-by-case basis, to suit a specific application.

The foregoing has described a turbine airfoil for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An airfoil for a gas turbine engine, comprising:
   opposed pressure and suction sidewalls extending between spaced-apart leading and trailing edges, a root, and a tip;
   a hollow plenum disposed between the sidewalls and having a profile bounded by opposed top and bottom edges and opposed forward and aft edges, the forward and aft edges being generally linear;
   the plenum having a chordwise first dimension at a radially outer end thereof, and a chordwise second dimension at a radially inner end thereof, the second dimension being substantially less than the first dimension;
   wherein the forward edge is disposed at a first angle to a radial direction, such that a radially inner end of the forward edge is aft of a radially outer end thereof; and
   the aft edge is disposed at a second angle to a radial direction, such that a radially inner end of the aft edge is forward of a radially outer end thereof.

2. The airfoil of claim 1 further including at least one reinforcing pin extending laterally through the plenum and interconnecting the pressure and suction sidewalls.

3. The airfoil of claim 1 wherein the second angle is substantially greater than the first angle.

4. The airfoil in claim 1 wherein the bottom edge is a continuous convex-downward curve.

5. The airfoil of claim 1 further comprising:
   a platform disposed at the root;
   a shank extending radially inward from the platform; and
   a dovetail extending radially inward from the shank.

6. The airfoil of claim 1 wherein avertical section of the plenum containing its maximum radial extent is substantially aligned with a vertical section of the airfoil containing its maximum thickness in a lateral direction.

7. An airfoil for a gas turbine engine, comprising:
   opposed pressure and suction sidewalls extending between spaced-apart leading and trailing edges, a root, and a tip;
   a hollow plenum disposed between the sidewalls and having a profile bounded by opposed top and bottom edges and opposed forward and aft edges, the forward and aft edges being generally linear;
   the plenum having a tapered shape with a greater chordwise dimension at its radially outer end than at its radially inner end, wherein a centroid of the plenum is disposed substantially forward of a mid-chord position of the airfoil;
   wherein the forward edge is disposed at a first angle to a radial direction, such that a radially inner end of the forward edge is aft of a radially outer end thereof; and
   the aft edge is disposed at a second angle to a radial direction, such that a radially inner end of the aft edge is forward of a radially outer end thereof.

8. The airfoil of claim 7 further including at least one reinforcing pin extending laterally through the plenum and interconnecting the pressure and suction sidewalls.

9. The airfoil of claim 7 wherein the second angle is substantially greater than the first angle.

10. The airfoil of claim 7 wherein the bottom edge is a continuous convex-downward curve.

11. The airfoil of claim 7 further comprising:
    a platform disposed at the root;

a shank extending radially inward from the platform; and
a dovetail extending radially inward from the shank.

12. The airfoil of claim 7 wherein a vertical section of the plenum containing its maximum radial extent is substantially aligned with a vertical section of the airfoil containing its maximum thickness in a lateral direction.

* * * * *